July 31, 1956 H. E. SLOAN ET AL 2,757,009
CHUCKS
Filed Feb. 4, 1952 2 Sheets-Sheet 1
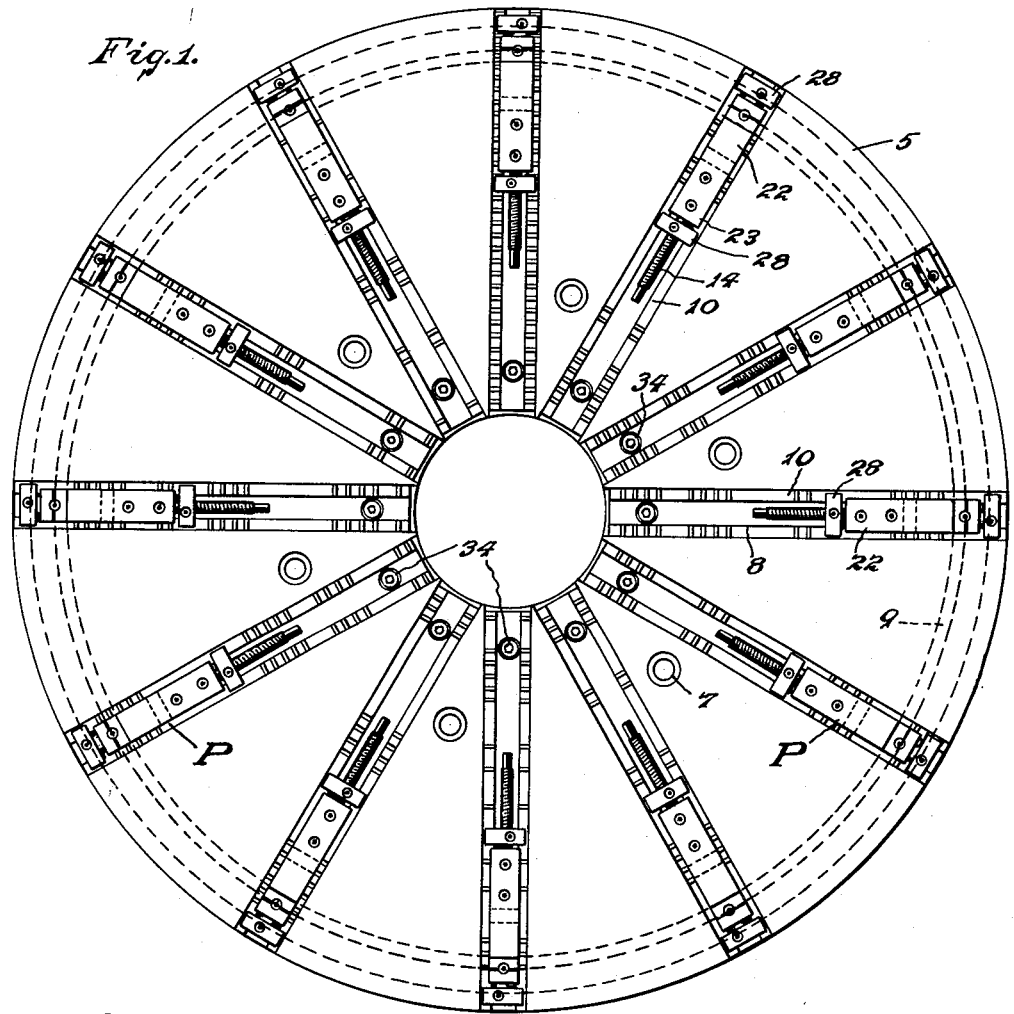
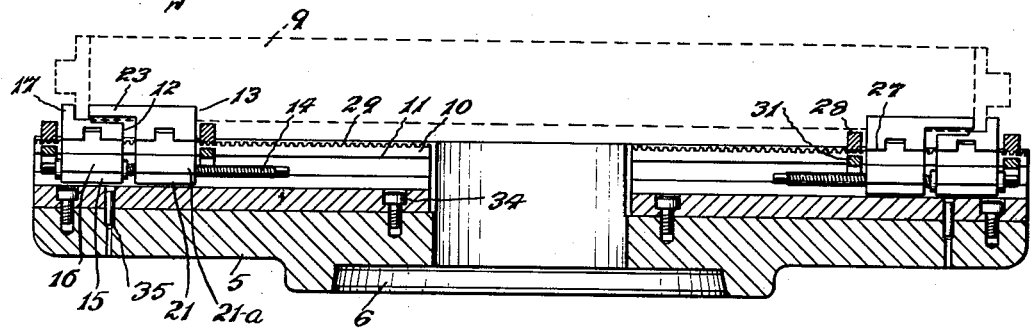
INVENTOR.
HARRY E. SLOAN.
BY HERBERT W. HICKEY.
Louis V. Lucia
ATTORNEY.

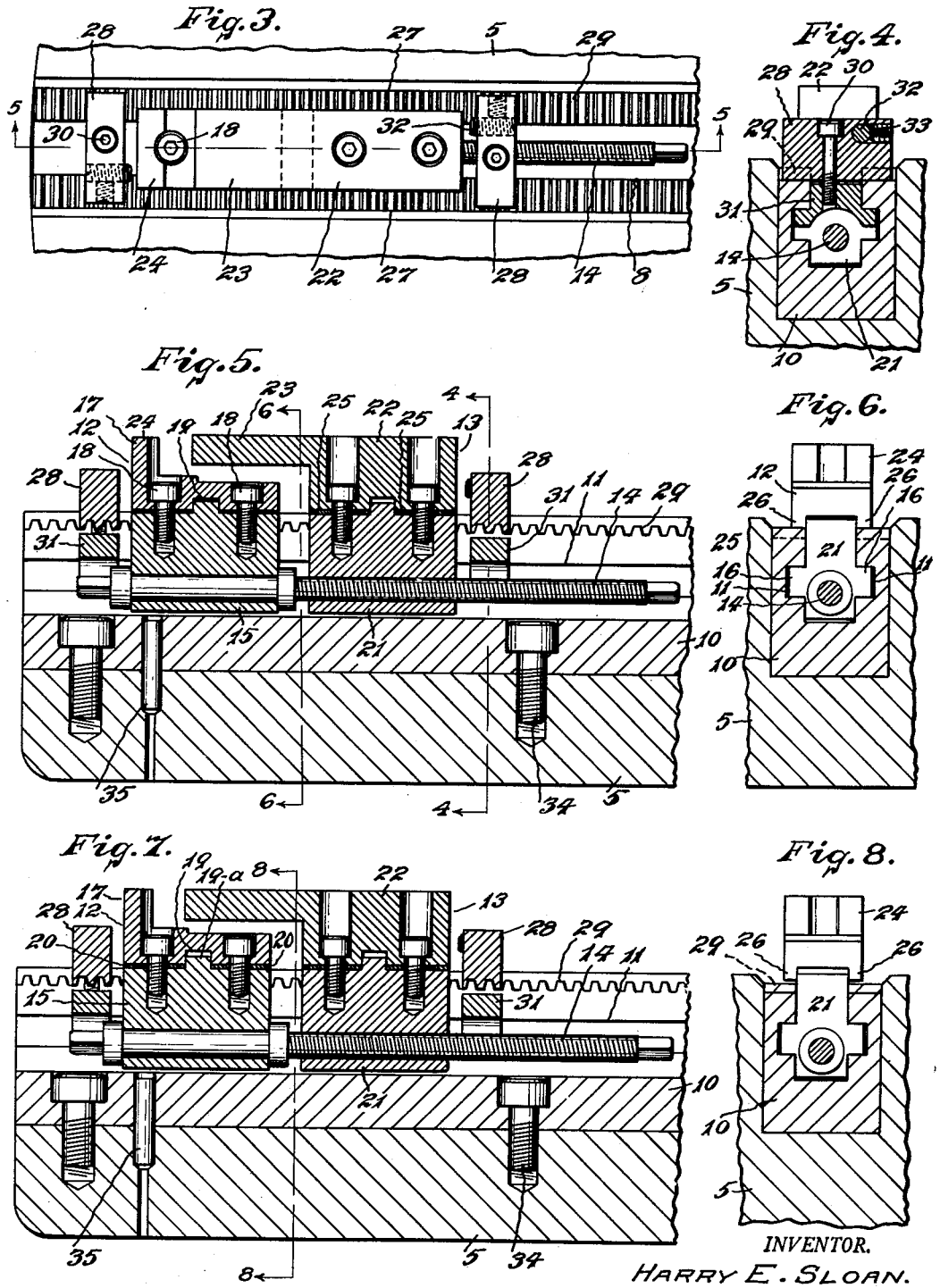

United States Patent Office 2,757,009
Patented July 31, 1956

2,757,009

CHUCKS

Harry E. Sloan and Herbert W. Hickey, Hartford, Conn., assignors to The Cushman Chuck Company, Hartford, Conn., a corporation of Connecticut Application February 4, 1952, Serial No. 269,874

20 Claims. (Cl. 279—112)

This invention relates generally to chucks and more particularly to chucks for turning machines such as vertical or horizontal lathes and the like.

It is an object of this invention to provide a chuck for such machines which is particularly adapted for chucking rings of different diameters.

A further object of this invention is to provide such a chuck in which a ring to be turned in a machine may be quickly and easily chucked without being distorted.

A still further object of this invention is to provide such a chuck having floating chucking jaws which will readily adjust themselves in conformance with the portion of the ring or other workpiece being chucked therein and automatically secure it to the chuck.

A still further object is the provision of a chuck having one or more sets of floating jaws which will automatically become clamped to the body of the chuck upon a workpiece being clamped between said jaws.

Further objects and advantages of this invention will be more clearly understood from the following description and the accompanying drawings in which:

Fig. 1 is a plan view of a chuck embodying our invention.

Fig. 2 is a side view thereof, in central vertical section, showing some of the parts in elevation.

Fig. 3 is a plan view of one set of positioning and clamping jaws.

Fig. 4 is a sectional end view on line 4—4 of Fig. 5.

Fig. 5 is a side view, in central vertical section, on line 5—5 of Fig. 3.

Fig. 6 is a sectional end view on line 6—6 of Fig. 5.

Fig. 7 is a side view, in central vertical section, of a set of floating jaws.

Fig. 8 is a sectional end view on line 8—8 of Fig. 7.

In the embodiment illustrated in the drawings, the numeral 5 denotes the base of our improved chuck which is preferably disc-shaped and provided with a recess 6 by means of which the chuck is centered upon the spindle of a lathe or the like to which it is secured by screws extending through holes 7 in said base.

The base 5 is provided with radially extending slots 8—8 in which there are slidably mounted a series of cooperating jaws for clamping a work-piece, such as a ring indicated in dotted lines at 9, to the said chuck. In the embodiment shown, the said base 5 is preferably constructed of a soft metal, such as aluminum, and the slots 8 are, therefore, contained within longitudinal liners or bars 10 that are made of a metal, such as steel, which is more resistant to wear.

Each of the radial slots 8 has a pair of opposed lateral slots 11—11 in the sides thereof and in each of the said lateral slots there is slidably mounted a pair of cooperating jaw units 12 and 13 which are connected by means of a clamping screw 14 that is rotatably anchored in the unit 12 and threaded to the unit 13 for drawing the jaws of said unit into clamping position upon the work.

The unit 12 includes a master jaw 15 which is slidable within the radial slot 8 and has side ribs 16—16 which slidably fit in the lateral slots 11—11; the top and bottom sides of said ribs fitting snugly with relation to the respective sides of the slots 11—11 but permitting sliding movement of the master jaws along the radial slots 8.

Upon the said master jaw 15 there is secured a top jaw 17 by means of suitable screws 18—18; the said top jaw having a cross groove 19 and the master jaw having a cooperating vertical rib 19–a which fits within said groove for resisting longitudinal movement of the top jaw relatively to the master jaw. Between the said master jaw and top jaw, there is provided a pair of shims 20—20 which space the top jaw from the master jaw for the purpose to be hereinafter described.

The unit 13 includes a master jaw 21 which is also slidable within the radial slot and has the ribs 21–a—21–a that slidably fit in the lateral slots 11—11. In the embodiment shown, this unit 13 has an extension 23 which is adapted to cooperate with the vertical projection 24 on the top jaw 12 for clamping the ring 9 between the jaws 22 and 17. The said top jaw 22 is also spaced from the master jaw 21 by means of a pair of shims 25—25.

Both the top jaws 17 and 22 are formed with downwardly extending side portions 26—26 and 27—27, respectively, which are adapted to engage with the top surfaces of the bars 10 when it is desired to clamp either of the units 12 or 13 to the chuck body for the purpose to be hereinafter explained.

Located at opposite ends of each set of jaws and adjacent to the units 12 and 13, there are provided stop blocks 28 each of which has teeth on the underside thereof that are adapted to intermesh with teeth 29, along the tops of the bars 10, to approximately position the said stop blocks in any position along the slots 8. The said blocks are each clamped in position by means of a clamping screw 30 which extends downwardly through the block and into an anchoring nut 31 that fits within the slot 8 and has lateral projections engaging the top sides of the lateral slots 11—11.

Each of said blocks 28 has an adjusting and abutment screw 32, which extends through the block and is threaded thereto, and a set screw 33 for retaining the screw 32 in adjusted position.

As shown in the drawings, the bars 10 may be secured to the base 5 by such means as the screws 34 and the dowel pins 35. It will be understood that, when the base 5 is constructed of a wear-resisting material, such as steel or the like, the said bars 10 need not be used and the slots 8 may be provided directly in the base itself.

The operation of our improved chuck is as follows:

The different sets of jaw units are first located upon the base 5, in accordance with the particular diameter of the ring 9 which is to be chucked, by sliding the said sets along their respective slots 8. The blocks 28 are then approximately positioned adjacent the opposite ends of each set of jaws, so that they are spaced from the end of the jaws sufficiently to allow a desired amount of free sliding, or floating, movement for the jaw sets between the said blocks and thereby permit them to normally float in the slots 8 when they are not in clamped condition.

All of the said jaw sets are adapted to be clamped in position so as to quickly center the ring 9 centrally with respect to the axis of the chuck and, assuming that the jaw sets indicated at P—P are to be used as positioning sets and the top jaws 17 thereof as positioning jaws for the said ring, they may be secured to the chuck base in the following manner:

The shims 20—20 below each of the said top jaws 17 are first removed and the said jaws are then replaced upon their respective master jaws 15. The jaw unit 12 is then accurately adjusted in its proper position by means of the set screw 32, to properly center the ring 9 upon the chuck, and the screws 18—18 are tightened so as to force the side portions 26—26 of the said top jaws against the tops of the teeth 29 in the bars 10 and thereby securely clamp the unit to the base member 5. The said clamped units will then serve as positioning means for locating the ring relatively to the axis of the chuck before it is clamped into position upon the chuck body.

When all of the jaw sets have been properly located upon the chuck body, as above described, the chuck will have been adjusted for quickly and accurately chucking rings of a particular size for a turning operation thereon on a volume production basis. As each ring is to be chucked, it is first placed upon the chuck so that it will rest between the jaws of all of the jaw sets thereon. The ring is then clamped between the jaws of the clamp sets P—P by rotating the clamping screws 14 thereof. Rotation of the said clamping screws will cause only the unit 13 of said positioning sets to move in the direction of the unit 12 for a clamping operation. When the ring has thus been clamped between the said positioning sets, it may also be clamped between all of the remaining floating jaw sets by rotation of their respective clamping screws 14.

When in their unclamped condition, each set of jaws is normally floating between its respective retaining blocks 28 so that it may be moved in the slots 8, to the extent permitted by the blocks 28, and become located in accordance with the particular position of the ring 9 as positioned by the positioning sets P—P with respect to the axis of the chuck. Therefore, as each floating jaw set is being brought into clamping engagement with the said ring, by the rotation of the respective screw 14, the jaw unit of said set which first engages the ring will come to rest as it does so and the other jaw unit will move further towards the ring until it engages the opposite side of the ring. Further rotation of the clamping screw will then tighten the upper portions of the jaw units against the opposite sides of the ring and, at the same time, the clamping force applied to the jaw units by such rotation of the screw will also tend to force the bottom portions of said jaw units towards each other and thereby apply a force upon each of the jaws which will theoretically tilt them in opposite directions and cause the tops and bottoms of their respective ribs 16—16 to become cramped against their respective sides of the slots 11—11 and thereby firmly bind said jaw sets to the base member 5 so as to clamp the ring against lateral and rotational movement with relation to the chuck.

It will be clearly understood from the above description that our invention generally provides a self-adjusting or floating set of clamping jaws which will first adjust itself in accordance with the position of a work piece which is being clamped therebetween, and then automatically bind itself in position, as the jaws are tightened upon the said work piece, so that the rotation of the clamping screw of each set of jaws performs two operations; namely, that of moving the jaws to their accurate work-engaging position and that of securing the jaws in position upon the chuck, or other carrier or base member for said jaws, to accurately hold the work in its clamped position.

It will also be understood that any of the jaw sets may be used as positioning jaws by simply removing their shims 20—20 and then clamping the respective units in position to provide a locating point for the work.

The jaw sets may also be reversed in the slots 8, from their positions shown in the drawings, by simply turning the sets around and then reinserting them in the slots 8. When the jaw sets are so reversed, the chuck will be adapted for a ring of a much smaller size than that shown in the drawings and the jaws may be drawn together by rotating the clamping screws 14 from their outer ends, both ends of the said screws being provided with wrench-receiving heads as shown.

It will also be understood that the jaws 23 of any of said sets may be used as positioning jaws by removing their shims and clamping them in the same manner as above described.

If desired, separate means, such as stationary members, may be employed to locate the work piece and all of the jaw sets may then be used as floating self-adjusting jaws for clamping the work piece in position.

We claim:

1. A device including a base having a pair of clamping jaws separately movable thereon, means for drawing said jaws into clamping position upon a work piece, and means for automatically securing said jaws directly to said base upon the jaws being forced into clamping position.

2. A device including a base, a pair of connected clamping jaws separately slidable upon said base, a clamping screw carried by said jaws for drawing them into clamping position upon a workpiece, and means operable by the force applied to the jaws by said screw for automatically securing each of said jaws directly to said base upon the said jaws being forced into clamping position.

3. A device including a base member, means for locating a work piece upon said base member, a pair of connected clamping jaws separately slidable on said base and self-adjustable to the located work piece as they are brought into clamping position, and means for automatically securing each of said jaws directly to the base member as they are clamped upon the work piece.

4. In a device including a base having a slot therein, a set of clamping jaws freely slidable in said slot and including a pair of separately slidable connected opposed jaws, a clamping screw carried by said jaws for drawing them into clamping position upon a workpiece, and a slidable connection between each of said jaws and the walls of the slot automatically securing the jaws directly to the base when they are in clamping position.

5. In a device including a base having a slot with grooves in the walls thereof, a jaw set including a pair of opposed jaws separately slidable in said slot and a single clamping screw carried by said jaws for drawing them towards each other into clamping position upon a work piece, and separate lateral projections on each of said jaws extending into said grooves and engageable with the side walls thereof for automatically securing the jaws to the base when they are forced into clamping position.

6. In a chuck including a base having radial slots therein and a set of jaws in each of said slots for securing a ring to said chuck, each of said sets of jaws including a pair of opposed clamping jaws each separately slidable in a common slot, a single clamping screw carried by said jaws for drawing them into clamping position upon said ring, the said jaws being jointly freely slidable in their common slot to permit adjustment of the jaws along the slot in accordance with the position of the ring upon the chuck, and means operable by the clamping force applied to said jaws by the screw for automatically securing each set of jaws directly to the base when the ring is clamped therebetween.

7. In a chuck including a base having a slot therein, a pair of opposed clamping jaws each separately slidable in said slot, a single clamping screw carried by said jaws for drawing them into clamping position upon a work piece, stop means for movably locating said sets of jaws upon the base, each set of jaws being jointly freely slidable in its respective slot to permit adjustment of the jaws between said stop means in accordance with the position of the work piece upon the said base, and means for automatically securing the jaws to the base when they are drawn into clamping position upon the work piece.

8. In a chuck including a base having slots therein, a set of jaws freely slidable in each of said slots, each of said sets including a pair of opposed jaws separately movable relatively to each other in the respective slot, a single clamping screw carried by said jaws for drawing them together into clamping position upon a workpiece, stop means adjacent the opposite ends of said sets for locating them in approximate positions to receive the workpiece upon said base, and a sliding connection between the sides of said grooves and each of said jaws adapted for automatically binding and thereby securing the jaws to the base when they are drawn into clamping position.

9. In a chuck including a base having slots therein, a set of clamping jaws freely slidable in each of said slots, each of said sets including a pair of master jaws directly slidable in the same slot, separate side ribs on each of said master jaws fitting within longitudinal grooves in the sides of the said slot, a top jaw upon each of the master jaws, and a clamping screw connecting said master jaws and operable to draw the top jaws into clamping position upon a work piece and automatically bind the said ribs within the grooves and thereby secure the jaw set to the base.

10. In a chuck including a base having slots therein, a set of clamping jaws freely slidable in said slots, each of said sets including a pair of opposed master jaws, a slidable rib and groove connection between each of the said master jaws and the sides of the slot, a top jaw secured upon each of said master jaws, spacing means between each of said master jaws and top jaws, means for securing the top jaws to the master jaws, the said top jaws overlying the marginal edge portions of the slots and being adapted to engage the said portions when the said spacing means are removed and thereby clamp the jaw unit to the base, and a clamping screw for drawing said master jaws towards each other and thereby clamping a piece of work between the said top jaws.

11. In a chuck including a base having a slot therein, a set of clamping jaws in said slot including a pair of jaw units each comprising a master jaw slidable in the said slot and having a sliding rib and groove connection with the walls of the slot, a top jaw secured upon each of said master jaws and having side portions overlying marginal edge portions along said slot, removable shims between said master jaws and top jaws, and screws for securing the top jaws to the master jaws; each of said top jaws being adapted to engage the surfaces of said marginal edge portions when the shims are removed and thereby clamp the jaw unit to the base.

12. A chuck including a base having a slot therein, a set of clamping jaws in said slot, adjustable stop means for locating said set of jaws on said base, the said jaw set being freely slidable in the slot between said stop means and including a pair of separately slidable cooperating jaws adapted to engage a piece of work, a clamping screw carried by said jaws for drawing them into clamping position upon the work, and means for automatically securing the jaws directly to the base upon the said work being clamped therebetween.

13. In a chuck of the character described, the combination of a base having radial slots therein, jaw sets slidable in said slots, each of said jaw sets including a pair of separately slidable jaws adapted to engage a piece of work, a single clamping screw carried by said jaws for drawing them into clamping position upon the work, and connecting means between the jaws and the sides of the slot adapted for automatically securing the jaws to the base as they are clamped upon the work, certain of said jaw sets having one of the jaws thereof secured in fixed position upon the base for locating the work relatively to the chuck and the other jaw being movable relatively to the fixed jaw for clamping the work therebetween and others of said jaw sets being freely slidable within the slots and into work engaging positions.

14. A chuck including a base having radial slots therein, stationary means adjustable on said base for centering a ring-shaped piece of work upon said chuck, and a jaw set freely slidable in each slot and engageable with said workpiece; the said jaw set including a pair of opposed jaws each separately slidable in the slot, a single clamping screw carried by said jaws for drawing them into clamping position upon said work, and means between each of the said jaws and base for automatically securing the jaws to the base upon the said jaws being drawn into clamping position.

15. In a chuck including a disc-shaped base having a plurality of radial slots therein, the combination of jaw sets freely slidable in said slots, each of said jaw sets including a pair of opposed jaw units each movable relatively to the other in the respective slot and having a clamping jaw cooperating with the jaw of the opposite unit for clamping a piece of work therebetween, a clamping screw carried by said units for drawing them into clamping position, adjustable stops on said base for locating said jaw sets, an adjusting screw on said stops for adjusting one of the units upon the said base to locate the piece of work to be clamped, clamping means for securing the adjusted unit in fixed position on said base, the cooperating unit being movable relatively to said fixed unit, and a plurality of other jaw sets having both units thereof freely slidable within their respective slots and adapted to engage said ring and adjust themselves upon the base in accordance with the ring and automatically become secured to the base without distorting said ring upon the said ring being clamped between the jaws of said movable jaw sets.

16. A chuck of the character described including a plurality of radial slots therein and jaw sets freely slidable in said slots, each of said jaw sets including a pair of separately slidable opposed jaws and a clamping screw carried by said jaws for drawing them into clamping position against the inside and outside of a ring-shaped work piece, certain of said jaw sets having one of the jaws thereof secured in stationary position upon the base and the other jaw thereof movable into engagement with the ring upon the rotation of the clamping screw, others of said jaw sets having both of their jaws freely and separately slidable within the slots and adapted to be moved into clamping position against the ring without distorting it, and means for automatically securing the said jaw sets to the base upon the ring being clamped therebetween.

17. A chuck of the character described including a plurality of radial slots therein and jaw sets freely slidable in said slots, each of said jaw sets including a pair of separately slidable opposed jaws and a clamping screw carried by said jaws for drawing them into clamping position upon a workpiece, certain of said jaw sets having one of the jaws thereof retained in stationary position upon the base and the other jaw thereof movable into engagement with the work upon the rotation of the clamping screw, others of said jaw sets having both of their jaws freely and separately slidable within the slots and adapted to be moved into clamping position against the work without distorting it, and means for automatically securing the said jaw sets to the base upon the work being clamped therebetween.

18. A chuck including a base having a slot therein, a set of clamping jaws each separately slidable in said slot and movable relatively to each other on a plane parallel to the plane of said base, a clamping screw carried by said jaws for moving them into clamping position upon a piece of work, and means for separately securing said jaws to the base upon the work being clamped between said jaws.

19. In a chuck including a base having slots therein, a clamping jaw unit freely slidable in said slot and including a master jaw having a slidable rib and groove connection between it and the side of the slot, a top jaw secured upon the said master jaw, spacing means between the master jaw and the top jaw, and means for securing the top jaw to the master jaw; the said top jaw being adapted to engage side wall portions of the slot when the said spacing means are removed and thereby clamp the jaw unit to the base.

20. A chuck for holding a ring-shaped member, the said chuck including a base having a plurality of radial slots therein, stationary means on said base for locating said member relatively to the base, a clamping jaw unit in each of said slots including a pair of jaws for clamping said ring-shaped member in said unit by engagement with inner and outer surfaces of the member, each jaw of said unit being separately slidable in the slot, a clamping screw for moving the jaws toward each other into clamping position upon the member, the said jaw unit being self-adjustable upon the base to engage the member without disturbing its location relatively to the base, and means for automatically securing said unit to the base upon the said ring-shaped member being clamped between said jaws.

References Cited in the file of this patent

UNITED STATES PATENTS

| | | |
|---|---|---|
| 196,525 | Herriot | Oct. 30, 1877 |
| 346,133 | Singer | July 27, 1886 |
| 518,136 | Coons et al. | Apr. 10, 1894 |
| 566,702 | Sellers | Aug. 25, 1896 |
| 1,263,058 | Griffith | Apr. 16, 1918 |
| 1,531,327 | Wood et al. | Mar. 31, 1925 |

FOREIGN PATENTS

| | | |
|---|---|---|
| 271,448 | Switzerland | Jan. 16, 1951 |

OTHER REFERENCES

American Machinist publication, August 11, 1888, page 7.